INVENTOR
MICHELE BONOTTO

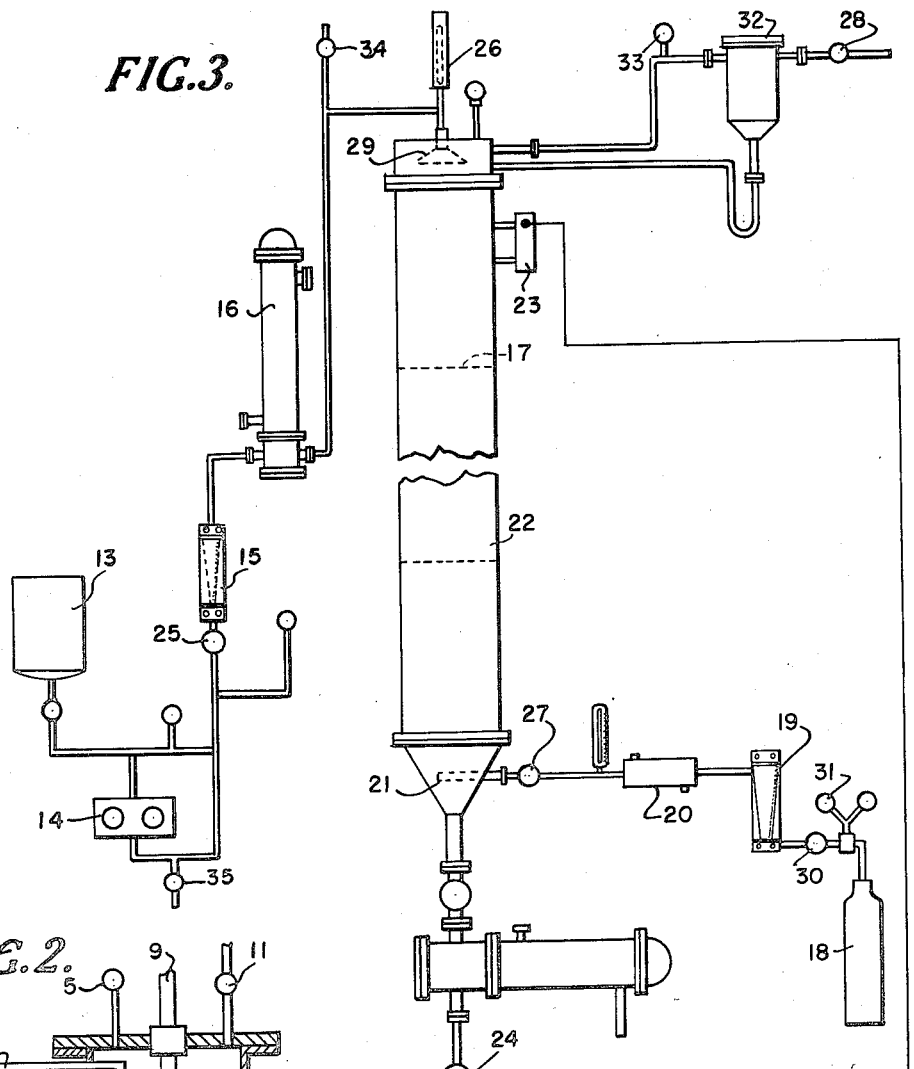
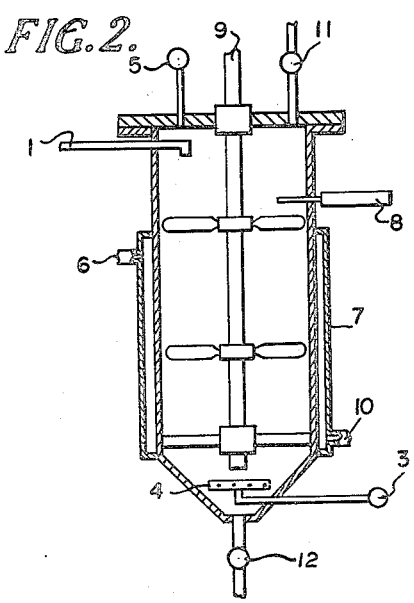

United States Patent Office 2,863,774
Patented Dec. 9, 1958

2,863,774

COFFEE BEAN PRODUCTS AND METHODS FOR PRODUCING SUCH PRODUCTS

Michele Bonotto, Princeton, N. J., assignor of one-half to McCormick & Company, Incorporated, Baltimore, Md., a corporation of Maryland, and one-half to Reginald M. Webster and Joseph Gola, Jr., both of New York, N. Y., and to said Bonotto Application October 4, 1956, Serial No. 614,008

9 Claims. (Cl. 99—71)

The present invention relates to a new method for producing an aqueous concentrated coffee extract from raw coffee beans and to the improved extract resulting therefrom. More particularly, the invention relates to an aqueous highly concentrated coffee bean extract comprising both the extract derived from roasted coffee beans and the extract derived from unroasted pre-conditioned coffee beans having been treated to develop the complex mixture of flavors and odors which constitute the so-called coffee aromas. This mixture of extracts constitutes the so-called "instant coffee" that, when diluted with hot water, results in a coffee beverage.

It should immediately be noted that the invention represents a novel and radical departure from former "instant coffee" processes and products, because the final aqueous concentrated coffee extract contemplates a highly concentrated mixture of extracts obtained respectively from roasted coffee beans and from pre-conditioned unroasted coffee beans having been treated, as noted above. Such method prevents the destruction and dissipation of natural volatile complex compounds and other constituents which contribute to the aroma and flavor characteristics of the ultimate "cup of coffee" obtained. Thus, as will be fully explained hereinafter, a final coffee extract is obtained of far richer flavor and aroma characteristics than realized by prior processes wherein the coffee extract was obtained from pre-roasted coffee bean alone or from unroasted coffee bean extract not subsequently treated in accordance with my process.

Various methods have been utilized in the past for the preparation of a fully flavored coffee bean extract from green coffee beans. In this respect, it should immediately be noted that the green coffee bean has no flavor or odor and these are developed during the roasting process.

The desired product obtained from conventional roasting of coffee beans may be considered the result of a complex and not wholly known pyroligneous decomposition, during which oxidation, reduction, polymerization and other more complex reactions may be expected to take place among the organic constituents of green coffee beans.

For example, in the conventional regular roast process, when heat is applied to a batch of coffee beans in conventional roasting machines, the temperature of the mass remains stationary at about 210–220° F. until the natural moisture is driven out. The temperature will then rise steadily and more or less rapidly, according to the rate at which heat is applied.

Usually, the desired temperatures of about 370–390° F. are reached in about 15 to 20 minutes from the moment when the aforementioned moisture is eliminated. During that period of rising temperature, a slow, constant change in color is noticed, accompanied by a development of unpleasant acrid pungent odors. As the temperature approaches about 360–370° F., and until the desired roasting point is reached, pleasant, delicate and characteristic odors are developed and are released from the beans, accompanied by a slight white smoke.

With further development of smoke a point is then reached when the beans, now of dark brown color, start to swell. The odor and aroma become stronger, gradually approaching the odor and aroma of finished roasted coffee. This point is closely watched by the expert roaster-operator and is governed by the particular market to which the final coffee bean product will be directed and by the characteristics of the beans themselves.

It should be noted that the conventional slow-roast process uses longer time and temperatures as low as 350° F. On the other hand, the conventional fast-roast process uses shorter time and temperatures as high as 420° F.

In the conventional "instant coffee" making process, wherein coffee beans are roasted in accordance with the above, the roasted beans are then subjected to an aqueous extraction and concentration process. However, in order to obtain a final extract of a great enough concentration to satisfy market conditions, the concentration of the extract of the pre-roasted coffee beans would result in the dissipation of the more volatile substances which contribute to the aroma and flavor characteristics of coffee.

Compare the above with my novel process wherein I succeed in producing a final concentrated extract including both the typical pyroligneous decomposition products which account for the basic flavor within the complex system of flavors and aromas of coffee, and the more volatile flavors and aromas developed during the swelling stage of coffee beans, but normally lost in the roasting and concentration of pre-roasted coffee extract. This process contemplates the utilization of conventional steps in order to obtain a pre-roasted coffee bean extract containing the pyroligneous decomposition products, and, in addition, an entirely new process which produces a coffee bean extract of a very high concentration yet with retention of delicate flavors and aroma constituents. The respective extracts obtained are combined to form a final highly concentrated coffee bean extract capable of producing an improved "cup of coffee" by the addition of water.

With the above in mind, the primary object of this invention is to produce a highly concentrated, fully flavored coffee bean extract from green coffee beans by a process which results in retention of coffee flavor and aroma to a far greater degree than was achieved by processes heretofore employed.

Another object of this invention is to provide a process for producing a highly concentrated, fully flavored coffee bean extract from green coffee beans whereby substantially all of the constituents which impart characteristic flavor to a cup of coffe and contribute to characteristic aroma of a cup of coffee, are retained in the final extract.

A further object of this invention is to provide a process for producing an aqueous, highly concentrated, fully flavored coffee bean extract from green coffee beans which comprises extracting a first coffee bean extract from pre-roasted coffee beans and concentrating the same, extracting a second coffee bean extract from pre-conditioned unroasted coffee beans, treating said second coffee bean extract in liquid highly concentrated form with oxygen, air, or mixtures thereof, to develop and enhance coffee flavors and aromas, and combining said first and second coffee bean extracts to form a final product.

An additional object of this invention is to provide a process for producing an aqueous, fully flavored, highly concentrated coffee extract from green coffee beans which comprises providing a quantity of green coffee beans, subjecting a first portion of said green coffee beans to a pre-conditioning step comprising the application of elevated temperature below the roasting temperature of green coffee beans, subjecting the remaining second portion of said green coffee beans to a roasting temperature, extracting with water a first and second coffee bean extract from said first and second portions respectively, and concentrating said extracts, treating said first coffee beans aqueous extract with an oxygen-containing agent selected from the group consisting of oxygen, air, and mixtures thereof to develop and enhance coffee flavors and aromas, and combining said first and second coffee bean extracts thereby obtaining an aqueous, highly concentrated, fully flavored coffee extract with more complete development and retention of flavors and aromas.

Still another object of this invention is to provide a mixture of pre-roasted coffee bean extract and a highly concentrated pre-conditioned unroasted coffee bean extract, and subjecting the said mixture to the action of oxygen, air, and mixtures thereof, whereby a highly concentrated, fully flavored coffee extract is obtained with more complete development and retention of flavors and aromas.

Another object of the invention is to produce a water-soluble, highly concentrated and fully flavored coffee bean extract composed of a portion of an extract from fully roasted coffee beans containing the more stable characteristic burnt flavor and aroma caused by pyroligneous decompositon of the beans when roasted in conventionally dried state, and a portion of an extract from pre-conditioned unroasted coffee beans in which the more volatile aromas have been developed by the action of oxygen, air, and mixtures thereof.

Other and further objects of the invention will be in part apparent and in part set out in the detailed description of the several steps in the process which follows.

Referring to the accompanying drawings:

Figure 2 illustrates one form of apparatus for batch-wise application of my invention; and Figure 3 illustrates one form of apparatus for continuous utilization of my invention.

Figure 1:
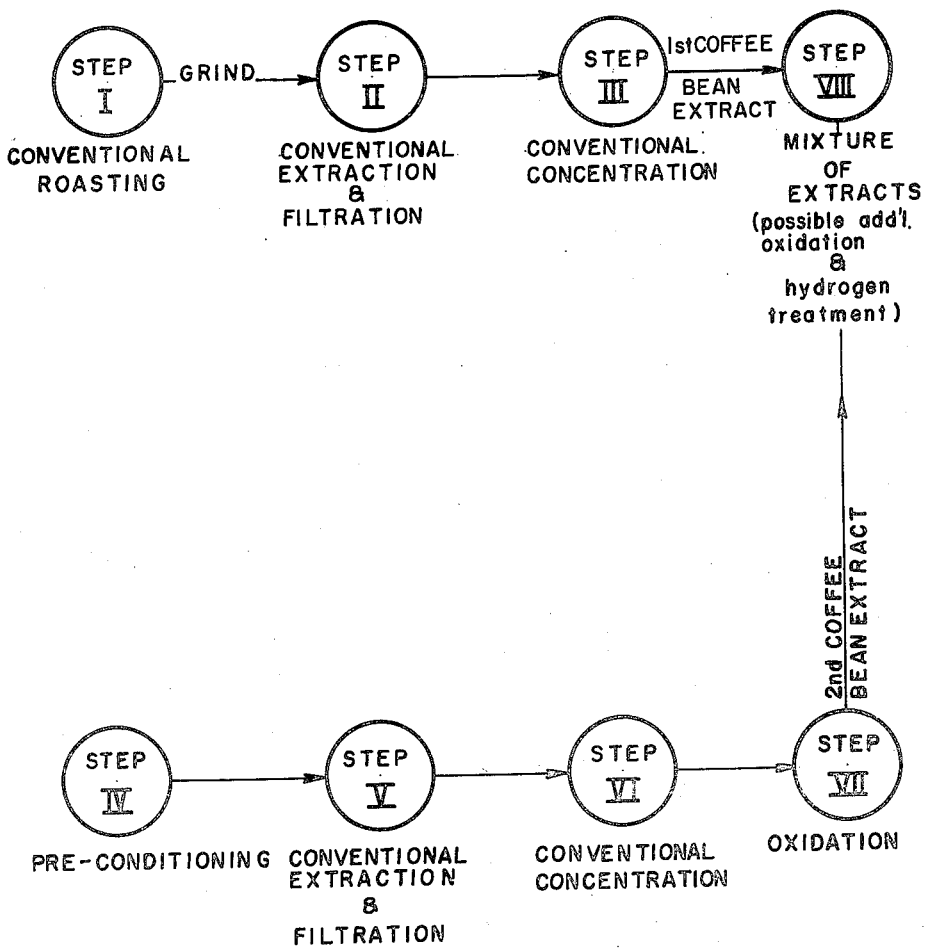
Figure 1 illustrates a flow diagram of the preferred sequence of steps comprising the process.

A process is disclosed in my co-pending application Serial No. 503,415, filed April 25, 1957, now abandoned, the subject matter of which is now set forth in my co-pending continuation in part application Serial No. 685,782, filed September 24, 1957, whereby color, flavor and aroma are developed in aqueous extracts from pre-conditioned green coffee beans by treating such extracts in liquid concentrated form, preferably in the presence of oxidizing agents such as oxygen, air, and hydrogen peroxide, at roasting temperatures and corresponding high pressures. During the aforementioned treatment step, the concentrated coffee bean extract is agitated so that the caramelized or roasted film of the extract which is formed locally on contact with the heated surfaces of the vessel wherein treatment is carried out, is scraped off and mixed again within the mix where it redissolves. The mix also will reabsorb the water liberated from the film as a result of roasting. Accordingly, the flavor and aroma of roasted coffee are kept in the extract and the cooled product, when dissolved in water, gives a beverage with all the quality of a freshly brewed conventional "cup of coffee." If the action of oxygen and the like is utilized, such is coincidentally carried out by the addition of air, hydrogen peroxide, oxygen, or mixtures thereof, as noted above.

According to the preferred form of the invention, in my said copending application Serial No. 503,415, the green coffee beans are first conditioned by subjecting them to temperatures as high as possible without developing the characteristic taste and aroma of roasted coffee. For this purpose a batch of say 500 pounds of beans is introduced in a conventional roaster; its rotating drum is started and moderate heat is applied until all the moisture is driven out of the beans and the temperature of the mass has reached approximately 200–212° F. At this point, the heat is increased gradually so that the temperature of the mass will be raised and will reach about 300–310° F. in about 12–14 minutes. The mass is then kept at that temperature for approximately 4–6 minutes. More heat is then applied slowly until a point is reached when an incipient odor of roasted coffee can be detected and a slight swelling of the beans is noticed. This final step will take about 3 to 5 minutes. The material is then rapidly discharged from the roasting machine and rapidly cooled by ventilation or quenching.

The whole preconditioning treatment can, of course, be carried out by supplying the heat gradually and incrementally for the total length of time specified above if the supply of heat in the type of machine used can be very closely regulated.

As heretofore explained the above conditions may vary considerably with different varieties and quantities of coffee beans under process; consequently, the figures supplied above are only considered as an example rather than as a fixed figure, and procedure under which the coagulation of the proteins and the elimination from the beans of the obnoxious substances existing or developed may be achieved. Experience only can establish for each variety and quantity of coffee beans the optimum conditions.

The preconditioned beans are then ground or comminuted or flaked to best suit the method of making the aqueous extract in the conventional way. To increase the percentage of coffee solids in the finished roasted "instant coffee" product, the present art resorts to an hydrolization operation by which some hemi-celluloses and other compounds existing in the green coffee beans and insoluble in hot water are thereby made soluble by subjecting, among other ways, the comminuted roasted beans or the grounds thereof to high temperature under pressure when the aqueous extract is made. This procedure may also be followed in making my extract from preconditioned coffee beans. This raw coffee extract is then filtered, if necessary, and concentrated up to 50–75% solids or more.

When my raw coffee extract is produced in the coffee-growing countries it may be shipped in highly concentrated and/or dehydrated form to the consumer-markets to be roasted there according to my process, thus realizing an important economy in handling and shipping costs over the conventional way of shipping the green beans to the coffee-consuming countries in order to be roasted and processed in said consuming countries to produce "instant coffee."

It is conceivable that the various heat treatments described above may possibly destroy the organic oxidative catalysts existing in the green beans mainly in the form of chlorophyll complexes. If desired, these catalysts may be added in proper proportion to my raw coffee bean extract before the same undergoes the roasting operation in the presence of oxygen.

The highly concentrated solution is then subjected to the roasting operation in the presence of oxygen which can be supplied as such, or as air, or as ozone, or as a mixture of these ingredients. Other oxidants can also be used which liberate oxygen under the conditions of the roasting process hereinafter specified, but I prefer the three mentioned above because there will be no objectionable chemical by-products left in the finished coffee extract as a result of the oxidation reaction. A weak solution of hydrogen peroxide, among other oxidants, however, can also be used.

It can be appreciated that the foregoing process, due to the application of roasting temperatures and corresponding pressures, produces a highly concentrated, fully flavored, aqueous coffee extract with no significant loss of flavor and aroma which are developed only after the desired concentration. Compare this with conventional concentration of fully roasted coffee bean extracts wherein all except the basic flavors within the complex system of flavors and aromas of coffee are distilled off during concentration of the aqueous extraction because such flavors were developed prior to concentration.

In view of the above, my present method contemplates combining conventionally roasted coffee bean extract which contains basic flavor characteristics, with a highly concentrated extract from pre-conditioned unroasted coffee beans basically treated in accordance with the method of application Serial No. 503,415, except for the utilization of standard pressures, and temperatures significantly lower than coffee bean roasting temperatures. The resulting mixture is a coffee extract of high concentration yet with complete flavors and aromas obtained without resorting to high temperatures and pressures in any way.

Referring to Figure 1, a given weight of green coffee beans are subjected to conventional roasting, as noted in step I. In steps II and III, the roasted beans, following grinding, are subjected to conventional extraction and filtration, and concentration. Aqueous extraction and a resulting aqueous concentrate are contemplated. The aqueous concentrate obtained in steps I through III comprises a first coffee bean extract. Incidentally, with a highly efficient countercurrent extraction operation, it is possible to obtain a roasted coffee extract of sufficiently high concentration so as to make possible the elimination of a specific concentration step III.

In step IV, an additional given weight of green coffee beans is subjected to a pre-conditioning step noted above and described in my application Serial No. 503,415, aforesaid. The beans are introduced into a conventional roaster where moderate heat is applied until all the moisture is driven out of the beans and the temperature of the mass has reached approximately 200–212° F. At this point, the heat is increased gradually so that the temperature of the mass will be raised and will reach about 300–310° F., in about 12–14 minutes. The mass is then kept at that temperature for approximately 4–6 minutes. More heat is then applied slowly until a point is reached when the odor of roasted coffee can be detected and a slight swelling of the beans is noted. This final phase will take about 3 to 5 minutes. Thereafter, the coffee beans are rapidly unloaded from the roasting machine and as rapidly cooled by ventilation or quenching.

At this point, it might be noted that steps I and IV can be combined, if desired, in that only a portion of the beans can be unloaded with the remainder being kept in the roaster until conventional roasting is completed. This latter modification is contemplated where no ready supply of pre-roasted coffee beans is available.

The pre-conditioning treatment may vary considerably with different varieties and quantities of coffee beans undergoing treatment. Consequently, the figures supplied above are only considered as exemplary. The basic criterion is that treatment should be carried out to coagulate proteins and to eliminate other obnoxious substances as noted in my aforesaid application Serial No. 503,415.

Following pre-conditioning, the pre-conditioned beans are ground and then subjected to conventional extraction and filtration in an aqueous medium as noted in step V. The extract obtained is highly concentrated in step VI by conventional procedure to the desired percent of solids.

Thereafter, the concentrate of step VI is treated with oxygen, air, or mixtures thereof, in step VII at temperatures significantly lower than coffee bean roasting temperatures. The exact temperature can be as low as room temperature and depends upon the speed of reaction desired. Atmospheric pressure is contemplated below a temperature of 212° F. Above such temperature, pressures as noted in standard steam tables will be used, depending upon the exact temperature, in order to avoid driving off the water of the aqueous concentrate under process.

It should be stressed that temperatures, time of reaction and relative quantity of oxygen and the like, cannot be specifically set forth. Such depends upon the ultimate taste of coffee desired and upon the variety of the green coffee bean used.

Step VII yields a second coffee bean extract. The first and second extracts are then combined in step VIII and constitute the final product. Normally, two parts pre-conditioned unroasted extract are combined with one part pre-roasted extract in step VIII. However, it should be understood that any proportion is contemplated depending upon the type of coffee bean used, the degree of roasting of the pre-roasted extract, the concentration of the respective extracts and the particular coffee taste ultimately desired. The end result is a highly concentrated extract, which, when diluted with hot water, results in a "cup of coffee" with all the desired qualities expected from a beverage brewed from fully roasted coffee beans exclusively.

In connection with the foregoing, it should be stated that I have subjected the combined extracts of step VIII to treatment with hydrogen gas by bubbling such gas therethrough at temperatures of around 212° F., followed by further treatment with oxygen, as noted in connection with step VII. It is significant to note that the action of the hydrogen gas appeared to enhance and develop to some extent the pyroligneous flavor of the extract mixture. Similarly, the additional reaction with oxygen more completely developed the highly volatile flavors and aromas thus yielding results approaching optimum.

Along the same line, the pre-conditioned beans of step IV and the pre-roasted beans of step I were combined after grinding and prior to extraction, filtration, and concentration. This bean mixture was subsequently extracted, filtered, and concentrated in accordance with steps V and VI. It was found that the green fruity taste of the pre-conditioned unroasted beans almost completely dominated the characteristic taste and aroma of the conventionally roasted coffee bean portion. However, when such concentrate was subsequently treated with hydrogen gas, followed by oxygen and the like, in accordance with step VII, for a time and at a temperature sufficient to carry out the substantial reactions occurring under the operating conditions, the result was a product having qualities quite similar to those achieved in step VIII by utilizing our preferred procedure fully described heretofore.

Obviously, rather than combining the pre-conditioned beans of steps IV and I, as noted in the previous paragraph herein, the extract from step VI can be combined with the extract of step III. Thereafter, the combined extract can be immediately oxygen-treated in accordance with step VII or first treated with hydrogen gas and then with oxygen and the like, as noted aforesaid in the previous paragraph. The utilization of hydrogen gas depends upon whether the pyroligneous compounds in the pre-roasted extract need reconstitution by means of the said hydrogen gas. These alternative sequences of steps are contemplated by my invention.

In accordance with my above-described invention, a coffee bean extract is obtained containing on the order of 50% to 75% solids, yet with no loss of taste and aroma. Compare this with concentrates obtained from conventional pre-roasted coffee bean processes wherein concentration is limited to about 35%–40% solids in order to avoid loss of taste and aroma.

The advantages obtained by the present invention are obvious. Greater concentration yields more cups of coffee per given volume. For example, one gallon of my coffee extract at 64% solids produces about 1400 cups (5 oz.) of coffee of conventional strength.

Another significant advantage is the fact that with greater concentration, one obtains greater keeping qualities. Specifically, the higher the percent of coffee solids, the longer are the desirable characteristics preserved.

Compare the above with tests carried out on conventional coffee extract containing 34% coffee solids. Immediately after preparation, a cup of coffee prepared by such conventional extract was ranked first by a professional test panel; was ranked fourth after being kept in a completely filled container for twelve days at 40° F.; was found undrinkable after twenty-six days' storage.

A 64% solids coffee extract prepared in accordance with my invention kept under the same conditions for forty-six days, was rated first by the same test panel. Moreover, the quality of a portion of this 64% solids concentrate, when kept in a semi-filled container improved during the first twenty days of storage.

The following table gives a more complete idea of the relationship between keeping quality and concentration.

A 20% solids extract kept 3 days.
A 45% solids extract kept 7 days.
A 55% solids extract kept 14 days.
A 60% solids extract kept 38 days.
A 69% solids extract kept 90 days.

All the above-listed samples were of the same blend, were made according to my process, and stored at 40° F.

A 75% solids extract kept for more than 5 months. However, at such concentration the mass is semi-solid at room temperature.

A further advantage of great importance associated with my invention is the fact that relatively inexpensive equipment can be used. In view of the fact that the delicate aromas and flavors associated with coffee are not developed until the reaction of step VII, extraction, filtration, and concentration can all be carried out more economically without the necessity of, for example, high vacuum conditions, extremely low temperature, freezing out the water, and the like.

It is easy to realize the usefulness of the present invention when the advantages of high concentrations without loss of desirable flavors and aroma are appreciated. The degree of concentration obtained by my process is limited only by the viscosity of the product at the process temperatures. It is obvious that the product must be kept fluid in order to be handled by the necessary equipment, as illustrated in Figures 2 and 3, and which will be described hereinafter.

Referring to Figure 2, one form of batchwise apparatus is illustrated and can be used in my invention in conjunction with standard roasting, grinding, extraction, filtration, and concentration equipment. The concentrated coffee extract of step VI is introduced in the apparatus of Figure 2 through the inlet 1 and the apparatus is filled to a desired level. When the apparatus is thus filled, the valve (not shown) controlling line 1 is closed and oxygen is introduced through inlet 3.

The oxygen is distributed by means of a sparger 4 in the form of bubbles which rise through the extract towards the top of the apparatus. When proper pressure is reached, and read on pressure gauge 5, by manipulating the valve 2, the desired pressure is maintained in the vessel, and the excess of oxygen is bled to the atmosphere. Steam introduced at 6 in the jacket 7 will supply any heat necessary to reach a desired temperature as read on the thermometer 8. To achieve a proper heat transfer and better distribution of the gas in the liquid extract an agitator 9 is supplied in the tank, driven by proper means (not shown). When the operation is completed, cold water is introduced into the jacket 7 through inlet 10 and discharged through 6. After opening the vent valve 11, the finished product is discharged through the valve 12 into the apparatus of step VIII.

In connection with the foregoing, the use of significantly high temperature and pressure has been contemplated. Of course, as clearly brought out heretofore, high temperature and pressure are not necessary if a longer time for reaction can be utilized. In no event does the temperature reach roasting temperatures.

Reference is made to Figure 3 which illustrates one form of apparatus used for continuous treatment in accordance with my invention. In the preferred form of operation, coffee extract from step VI is stored in supply tank 13. The extract is pumped from supply tank 13 by pump 14, measured by the flowmeter 15, through the heater 16 and distributed on top of the column 22, where it is subjected to the action of oxygen supplied by the tank 18, measured by the flowmeter 19, heated by the heater 20, and released at the bottom of column 22 through the sparger 21. The absorption column 22 may be insulated to avoid loss of heat by radiation. Said column 22 can be further supplied with perforated plates 17 spaced horizontally therein.

In my preferred form of operation, the absorption column 22 is kept full of the material undergoing treatment and the constant level in the column is regulated by a float control 23 acting remotely on the automatic discharge valve 24. My preferred operating conditions include a 230° F. temperature of extract entering the column, a 12 p. s. i. pressure in the column and a residence of material in the column of seven minutes.

By operating valve 25, I pump the liquid extract through the heater 16, which is so regulated that it will deliver the material at the top of the column at the required temperature shown on thermometer 26. When the column 22 is full, and pressure is desired in the column, I build up the required pressure by introducing oxygen from the supply tank 18, through the flowmeter 19, through the heater 20, through the check valve 27 and through the sparger 21. The pressure in the column will be constantly maintained by action of the automatic pressure valve 28. Of course, when operation is carried out at atmospheric pressure, the valve 28 is left open.

During the starting operation, a portion of the product will be slightly overtreated because of the time that must elapse before the valve 29 is opened to let the extract run continuously through the column to the valve 24. After this initial period, all the extract travelling through the column will be uniformly treated.

By manipulating the valve 30, I will be able to introduce the oxygen gas at such a rate as to keep a constant pressure in the column, as read on the pressure gauge 31, and, in addition, to provide a little excess of the oxygen gas that will escape to atmosphere through the regulating pressure valve 28.

Any occasional foam developed during the process will be collected by the catch-all 32 and returned to the top of the column. The safety valve 33 will take care of any sudden rise in pressure.

My process can also be carried out as described above but with the column 22 empty of liquid. The extract is sprayed at the top of the column 22, which will be packed with conventional packing material. The rate of feed will be so regulated that a particle of material will take a predetermined time, with seven minutes being preferred, to flow from the top of the column to the bottom thereof. In this case, the automatic level control 23 will be located at the bottom of the column.

The column also may be operated in an empty condition by allowing the extract sprayed at the top to fall through perforated plates 17 at a predetermined rate, normally seven minutes from top to bottom of column 22. Of course, these same perforated plates 17 act as a means to subdivide bubbles of oxygen blown in the bottom of the column when the operation is carried out with the column in full condition, as firstly described heretofore. The valve 34 is a vent valve and valve 35 is a drain valve.

When air is used instead of oxygen, it is obvious that either a higher rate of flow or a longer time of reaction in the column will be needed.

My invention is more fully illustrated by the following specific examples.

*Example 1*

Green coffee beans of the African variety and of the Brazilian variety were separately roasted in the conventional way in standard machinery, the degree of roasting being kept slightly on the over-roasted side. The roasted beans were then separately ground, water-extracted, countercurrentwise at a temperature of 205° F., and the extract filtered. The extraction operation was so regulated that each of the two resulting extracts contained about 42% solids and 58% water.

A mixture of coffee beans of the Colombian variety and of the Guatemalan variety were gradually heated to below roasting temperature, to wit, a temperature of around 350° F., until a point was reached when the odor of roasted coffee could be detected and a slight swelling of the beans was noted. At this time, the coffee beans were rapidly unloaded from the roasting machine, and as rapidly cooled by quenching.

These pre-conditioned coffee beans were then water-extracted at a temperature of about 225° F., and a pressure of 5 p. s. i. After filtration, the extract was evaporated in a jacketed vessel at atmospheric pressure, to a concentration of 70% solids and 30% water. This extract was then promptly transferred to a processing vessel wherein an excess of oxygen was introduced under the following conditions.

| | |
|---|---|
| Extract (pre-conditioned) | 500 grams. |
| Temperature of the mass | 230° F. |
| Pressure in the vessel | 10 p. s. i. |
| Time | 12 minutes. |
| Rate of oxygen | 100 bubbles per minute (estimate). |

The duration of the process operation, to obtain a satisfactory product, was determined by organoleptically testing samples withdrawn at sixty-second intervals. A greenish, astringent taste and odor indicates under-treatment, while a fruity, pruny-like flavor, associated with the characteristic roasting odor, indicates over-treatment.

Subsequently, 100 grams of the conventionally roasted extract (60 grams of African variety and 40 grams of Brazilian variety, both of 42% solids) were mixed with 300 grams (70% solids) of the pre-conditioned, oxygen-treated extract. The end result was a final product with full flavor, odor, and aroma of roasted coffee, containing 63% solids. Of course, it can be appreciated that, by varying the proportion of the respective extracts, a large variety of blends can thus be obtained with different characteristics of taste and aroma.

*Example II*

The procedure of Example I was carried out, except that air was used instead of oxygen and under the following conditions.

| | |
|---|---|
| Extract (pre-conditioned) | 500 grams. |
| Temperature of the mass | 250° F. |
| Pressure in the vessel | 15 p. s. i. |
| Time | 19 minutes. |
| Rate of air | 150 bubbles per minute (estimate). |

The air-treated extract (pre-conditioned) had characteristics closely comparable to the oxygen-treated extract (pre-conditioned) of Example I. When the pre-conditioned extract was blended, as indicated in Example I, with extract obtained from conventionally roasted beans, a product was realized similar to the final product of Example I.

*Example III*

The same procedure was utilized as in Example I with the following additional steps. The extract obtained from a combination of the pre-conditioned and conventionally roasted extracts was placed in a vessel and subjected to additional oxygen treatment by introduction of oxygen. The temperature was 200° F., the pressure in the vessel was 10 p. s. i., the time of treatment was 5 minutes, and the rate of introduction of oxygen was about 75 bubbles per minute.

It should be noted that the final product obtained in accordance with the foregoing can be subjected to further processing in a conventional drum dryer or spray dryer, to obtain a powdered "instant coffee." Standard techniques are contemplated.

With regard to the foregoing description of my invention, it should be emphasized that the term "green coffee bean" can and does contemplate a blend of various varieties of such beans.

As noted heretofore, although preferred ranges of temperature, time, pressure conditions, concentration, and the like have been set forth, broader ranges are many times contemplated. It must be understood that the invention is not limited to preferred ranges so long as the desired results are effected. The invention includes all variations in procedures covered by the appended claims and their equivalents.

I claim:

1. The method of producing an aqueous, fully flavored, highly concentrated fluid coffee extract from green coffee beans which comprises providing a quantity of green coffee beans, subjecting a first portion of said green coffee beans to a pre-conditioning step comprising the application of elevated temperature below the roasting temperature of green coffee beans, until the odor of roasted coffee can be detected, subjecting the second portion of said green coffee beans to a roasting temperature, extracting a first and second coffee bean extract from said first and second portions respectively, and separately concentrating each of said extracts in aqueous solution, reacting said first coffee bean aqueous extract with an oxygen-containing agent selected from the group consisting of oxygen, air, and mixtures thereof and at a temperature substantially lower than conventional coffee bean roasting temperature to develop and enhance the more volatile coffee flavors and aromas, and combining said first and second coffee bean extracts thereby obtaining an aqueous, highly concentrated, fully flavored coffee extract with more complete development and retention of flavors and aromas.

2. The method of claim 1 wherein the reaction of said first coffee bean aqueous extract with an oxygen-containing agent is carried out at a temperature of not greater than 212° F. and at atmospheric pressure.

3. The method of claim 2 wherein said temperature is room temperature.

4. The method of claim 1 wherein said pre-conditioning step comprises the application of a temperature between 200 and 212° F. until all of the moisture is driven out of said coffee beans, increasing the temperature to between about 300 and 310° F. for a time period of between about 4 and 6 minutes, and then increasing the temperature until the odor of roasted coffee can be detected and a slight swelling of the coffee bean is noted.

5. The method of claim 1 wherein the first coffee bean aqueous extract is agitated while being reacted with said oxygen-containing agent.

6. The method of claim 1 wherein the combined first and second coffee bean aqueous extracts are further reacted with hydrogen gas by bubbling such gas therethrough at an elevated temperature and thereafter reacting said combined extracts with an oxygen-containing agent selected from the group consisting of oxygen, air, and mixtures thereof.

7. The method of claim 1 wherein the reaction of said first coffee bean aqueous extract with an oxygen-containing agent is preceded by a step comprising reacting said first coffee bean aqueous extract with hydrogen gas.

8. The method of claim 1 wherein the combined aqueous, highly concentrated, fully flavored fluid coffee extract end product is subseqently dried to remove all water therefrom.

9. The method of producing an aqueous, fully flavored, highly concentrated fluid coffee extract from green coffee beans which comprises providing a quantity of green coffee beans, subjecting a first portion of said green coffee beans to a pre-conditioning step comprising the application of elevated temperature below the roasting temperature of green coffee beans until the odor of roasted coffee can be detected, subjecting the second portion of said green coffee beans to a roasting temperature, extracting a first and second coffee bean extract from said first and second portions respectively, and separately concentrating each of said extracts in aqueous solution, reacting said first coffee bean extract under continuous agitation with oxygen gas and at atmospheric pressure and temperature of not greater than 212° F. to develop and enhance the more volatile coffee flavors and aromas, and combining said first and second coffee bean extracts thereby obtaining an aqueous, highly concentrated, fully flavored coffee extract with more complete development and retention of flavors and aromas.

References Cited in the file of this patent

UNITED STATES PATENTS

| Number | Name | Date |
|---|---|---|
| 95,015 | Galloway | Sept. 21, 1869 |
| 843,530 | Gram | Feb. 5, 1907 |
| 1,175,490 | Vietinghoff | Mar. 14, 1916 |
| 1,932,769 | Copes | Oct. 31, 1933 |
| 2,119,329 | Heuser | May 31, 1938 |
| 2,149,876 | Wendt | Mar. 7, 1939 |